Dec. 12, 1961   K. L. WALLACE   3,012,447
TWO-REVOLUTION MECHANICAL STOP
Filed April 27, 1959
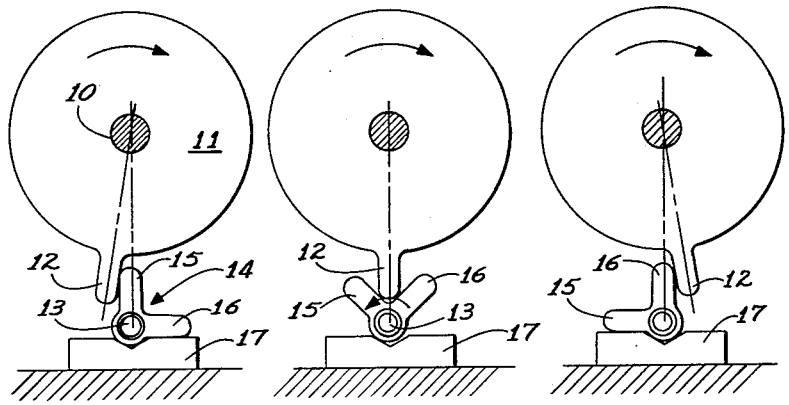
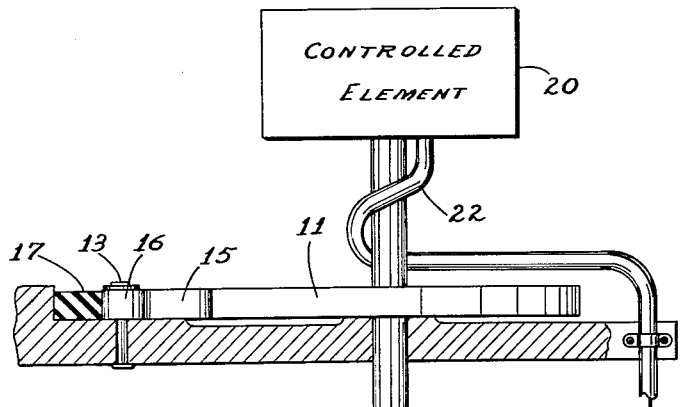
INVENTOR.
KEITH L. WALLACE
BY
ATTORNEY

United States Patent Office 3,012,447
Patented Dec. 12, 1961

3,012,447
TWO-REVOLUTION MECHANICAL STOP
Keith L. Wallace, Marion, Iowa, assignor to Collins Radio Company, Cedar Rapids, Iowa, a corporation of Iowa
Filed Apr. 27, 1959, Ser. No. 809,313
3 Claims. (Cl. 74—526)

This invention relates generally to a mechanical device for limiting the rotation of a rotatable element.

Often times it becomes necessary for a rotating element to be limited to a discrete number of revolutions. Mechanical devices such as rotatable antennas and the like have cables connected between the transmitter and the rotatable antenna and when they are rotated, the interconnecting cables may become torn loose or damaged if the antennas are permitted to rotate too many revolutions. Damage of this nature can be prevented by a stop mechanism which would limit the rotation of the antenna to a discrete number of revolutions in either direction.

Therefore, it is an object of this invention to provide a stop mechanism which will prevent a rotating element from being rotated in any one direction more than a predetermined number of revolutions.

It is another object of this invention to provide a stop mechanism which will permit a rotating element to rotate in either a clockwise or counterclockwise direction a maximum of two revolutions.

It is a further object of this invention to provide a stop mechanism that is fool proof and simple to construct.

It is still a further object of this invention to provide a stop mechanism that will dissipate the energy from a rotating mass when it is abruptly stopped.

This invention features a rotating disk containing a tooth on the periphery of said disk. The disk is mounted axially on a shaft which is connected to a rotating element. A two-tooth rotatably mounted pivot stop is in cooperative engagement with the tooth of said disk. As the disk rotates its tooth will engage an upwardly extending tooth of the pivot stop and cause the pivot stop to rotate in the direction of the movement of the disk tooth bringing the second outwardly extending arm into vertical position. As the disk tooth makes the second revolution and strikes the second upwardly extending tooth, the disk will be prevented from continuing its rotation since the first outwardly extending tooth is bearing against the stop plate. Reversal of direction of the rotating disk will reverse the sequence of the operation of the pivot stop, thus causing the rotating disk to again stop after two revolutions.

These and other objects, features, and advantages of the invention will become apparent from the following description and claims when read in view of the accompanying drawings, in which:

FIGURE 1 shows the stop mechanism with the rotating disk in a completely counterclockwise position;

FIGURE 2 shows the stop mechanism after the rotating disk has made one revolution;

FIGURE 3 shows the position of the pivot stop after the disk has been rotated fully clockwise; and FIGURE 4 shows an application of this stop mechanism to a control element such as an antenna.

Referring to FIGURE 1, mounted on a shaft 10 is a stop disk 11 which contains a radial extension or tooth 12. Rotatably mounted on a second shaft 13 is an L-shaped pivot stop 14 which contains teeth or arms 15 and 16 at right angles to each other. A stop plate 17, which may be of rubber or other yieldable material, is mounted so that arms 15 or 16 of pivot stop 14 may engage it.

Operation of this stop means can be explained by referring to FIGURES 1–3. In FIGURE 1 the stop disk 11 is in a full counterclockwise position with tooth 12 forced against tooth 15 of L-shaped pivot stop 14. Arm 16 resting firmly against stop plate 17. FIGURE 2 shows the stop disk after it has made one revolution. Tooth 12 is now intermediate the ends of teeth 15 and 16. As the stop disk continues to rotate, tooth 12 continues to move tooth 15 causing L-shaped pivot stop 14 to continue to rotate about its shaft 13. It is obvious that as the stop disk continues to rotate, arm 15 will rest against stop plate 17.

FIGURE 3 shows the position of the stop disk and pivot after the stop disk has made a second revolution and is now fully clockwise. The device will be completely stopped when tooth 12 has struck tooth 16 forcing tooth 15 securely against stop plate 17.

Stop plate 17 may be made of nonyieldable material if the mass of the rotating element is small enough that a sudden stop will not damage the rotating element or the stop mechanism. However, if the rotating element possesses a large mass, a means must be provided to absorb the energy when the mass is brought to an abrupt stop. Therefore, when stop plate 17 is constructed of a yieldable material such as rubber, L-shaped pivot stop 14 will continue to rotate slightly with arm 15 forcing itself into the stop plate 17. In this manner the energy from the large mass of the rotating element will be absorbed by the rubber stop plate 17.

It is obvious to one skilled in the art that other methods of absorbing the energy when the rotating element is stopped could be incorporated such as permitting tooth 12 to be deflected slightly under spring loading.

FIGURE 4 shows one embodiment of this invention which is adapted to prevent excessive rotation of a control element 20 by a driving mechanism 21 such that a cable 22 will not become damaged or disengaged by excessive rotation of control element 20. A control box such as 22 could be used to operate the driving mechanism. If switch 23 were switched to "ccw" or counterclockwise position, the antenna or control element would rotate until the stop mechanism has rotated a maximum of two revolutions. Likewise, if the control knob 23 were switched to the "cw" or clockwise position, the device would rotate a maximum of two revolutions clockwise.

As FIGURES 1–3 have been drawn the rotation of the element of the stop disk would not be a full 720° but rather would be limited on each extreme by the width of the tooth 12 and the width of arm 15 or 16. However, it is obvious that the face of the stop plate 17 could be angled sufficiently to obtain a full 720° angle of rotation if this should become necessary.

Although this invention has been described with respect to a particular embodiment thereof, it is not to be so limited, as changes and modifications may be made therein which are within the full intended scope of the invention as defined by the appended claims.

I claim:

1. A mechanical stop device for limiting rotation of a shaft, comprising: a rotatable shaft; means fixed to said rotatable shaft and having a projection thereon that travels in a fixed orbital path when said shaft is rotated; stop means including a plurality of radial arms one of which is engageable with said projection during a first revolution of said shaft to shift said stop means so that another said arm is engageable with said projection after further rotation of said shaft in the same direction; and means engageable with said stop means to limit the maximum rotation of said shaft in a given direction, the number of revolutions of said shaft never exceeding the number of said radial arms utilized.

2. A mechanical stop device for limiting rotation of a shaft, comprising: a first rotatable shaft; a stop disc fixed to said shaft for rotation therewith and having a projection thereon radially spaced from said first shaft so that said projection traverses a fixed orbital path when said stop disc is rotated; a second shaft parallel to said first shaft; a pivot stop pivotally mounted on said second shaft and including quadrature radial arms one of which is engageable with said projection during a first revolution of said stop disc to cause pivotal movement of said pivot stop so that the other of said radial arms is thereafter engageable with said projection after further rotation of said stop disc in the same direction; and means engageable with said pivot stop to preclude pivotal movement of said pivot stop in a direction other than that in which one of said radial arms to moved towards said fixed orbital path to thereby limit said first shaft to a maximum of substantially two revolutions in any one direction.

3. The substantially two revolution mechanical stop of claim 2 further characterized by the fact that said last named means is constructed of a yieldable material.

References Cited in the file of this patent

UNITED STATES PATENTS

| | | |
|---|---|---|
| 533,694 | Wilson | Feb. 5, 1895 |
| 1,899,250 | Wheelbarger et al. | Feb. 28, 1933 |
| 2,780,941 | Kollmorgen | Feb. 12, 1957 |